Dec. 14, 1954  A. C. MICKEY ET AL  2,696,768
BELLOWS FOLDING MACHINE
Filed Sept. 12, 1949  9 Sheets-Sheet 1
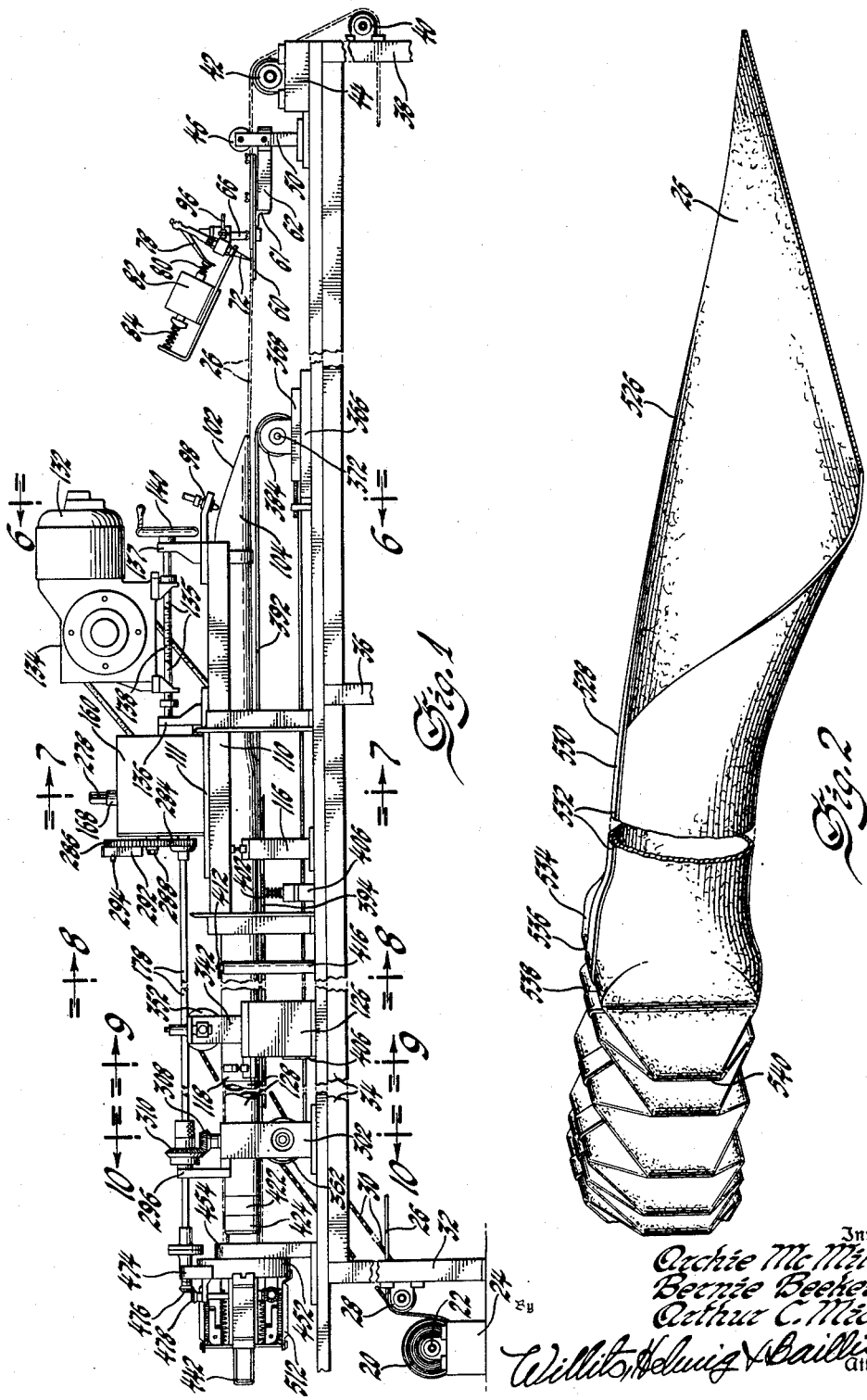

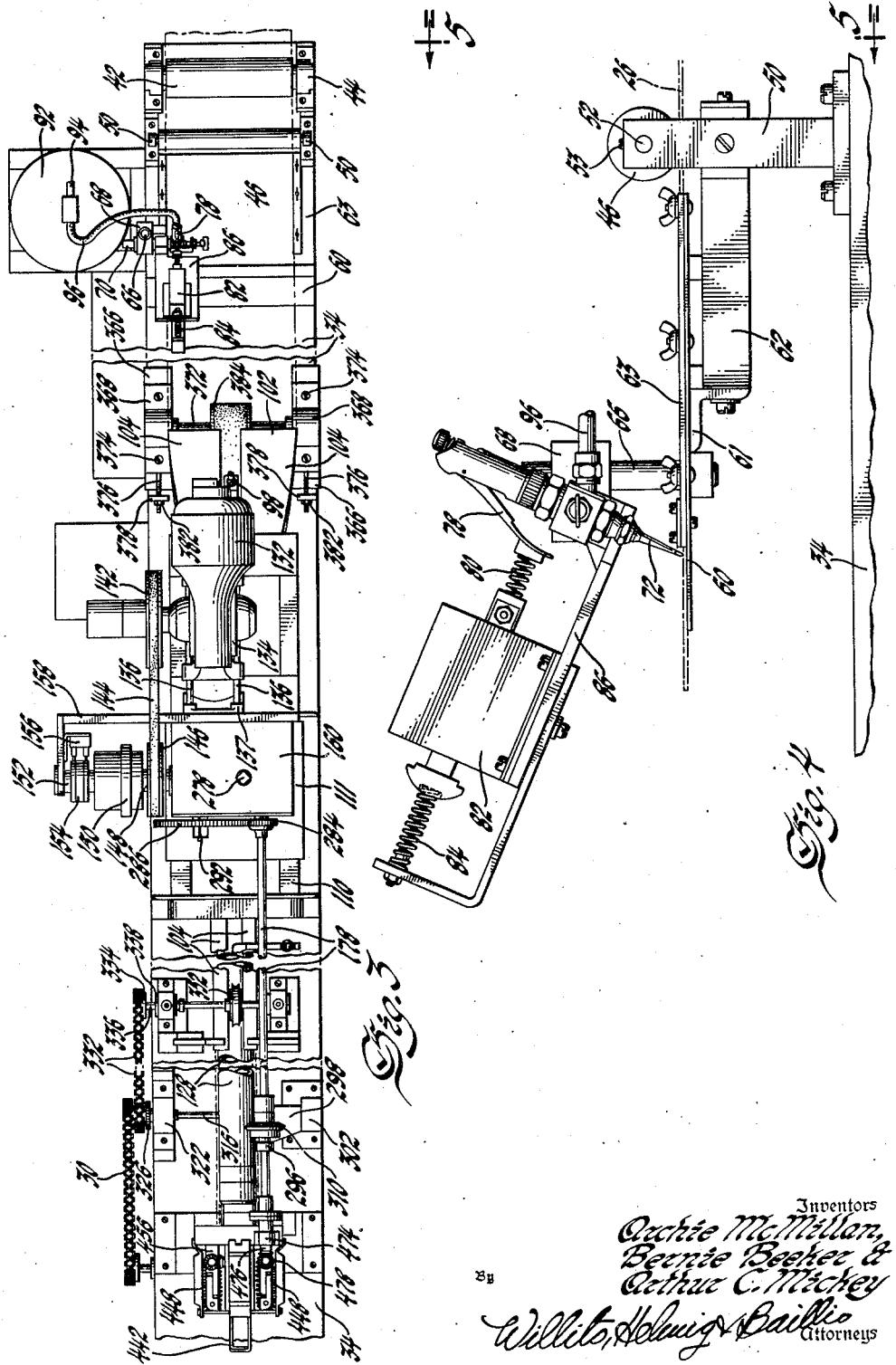

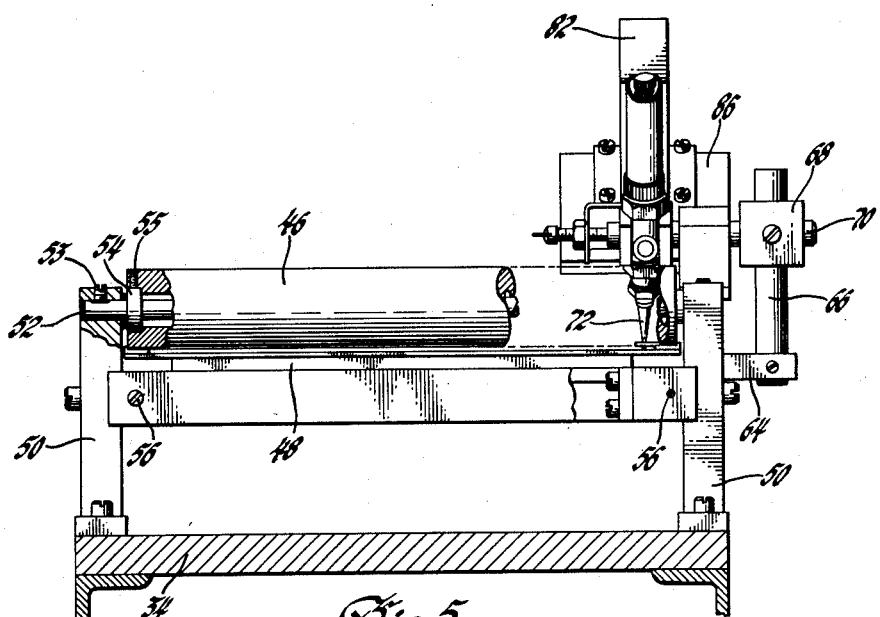
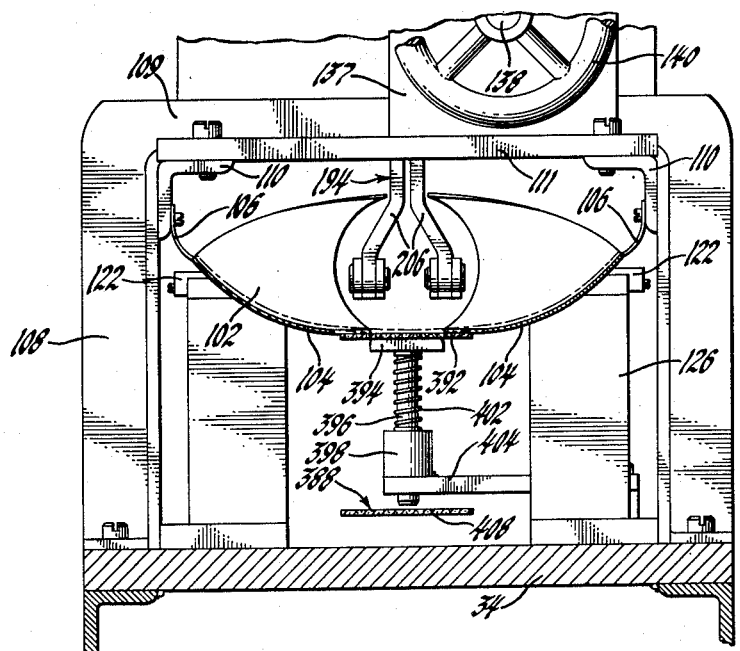

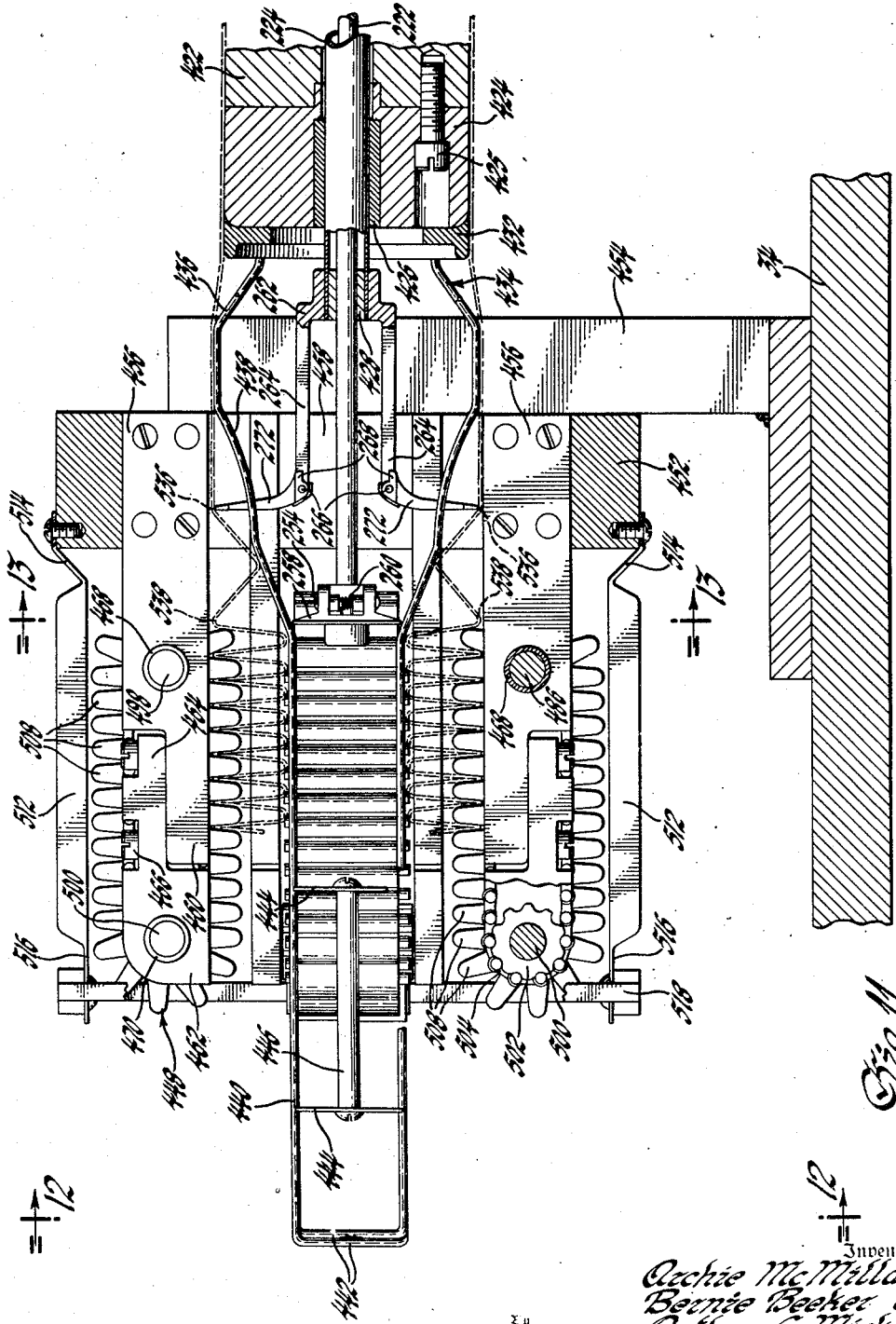

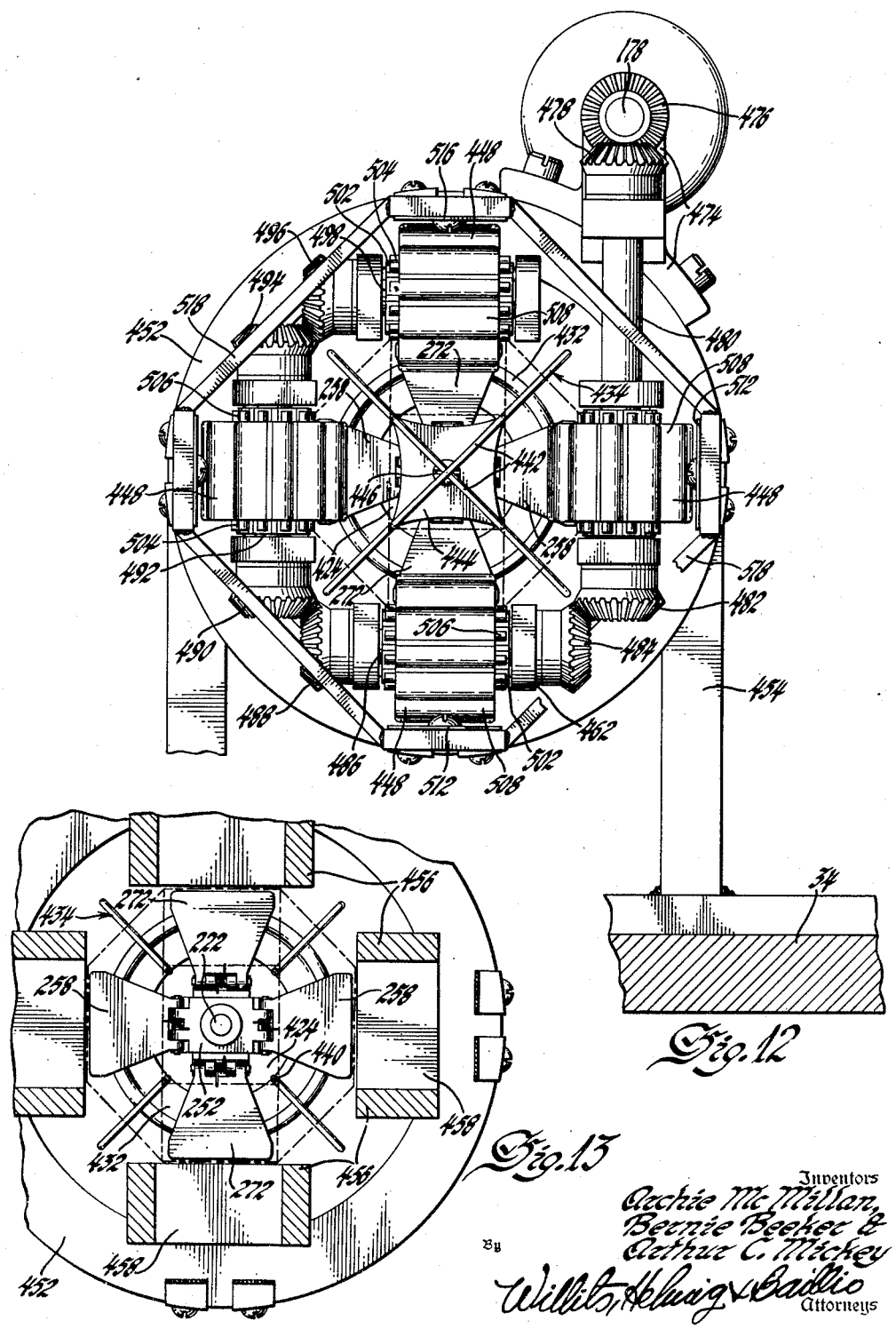

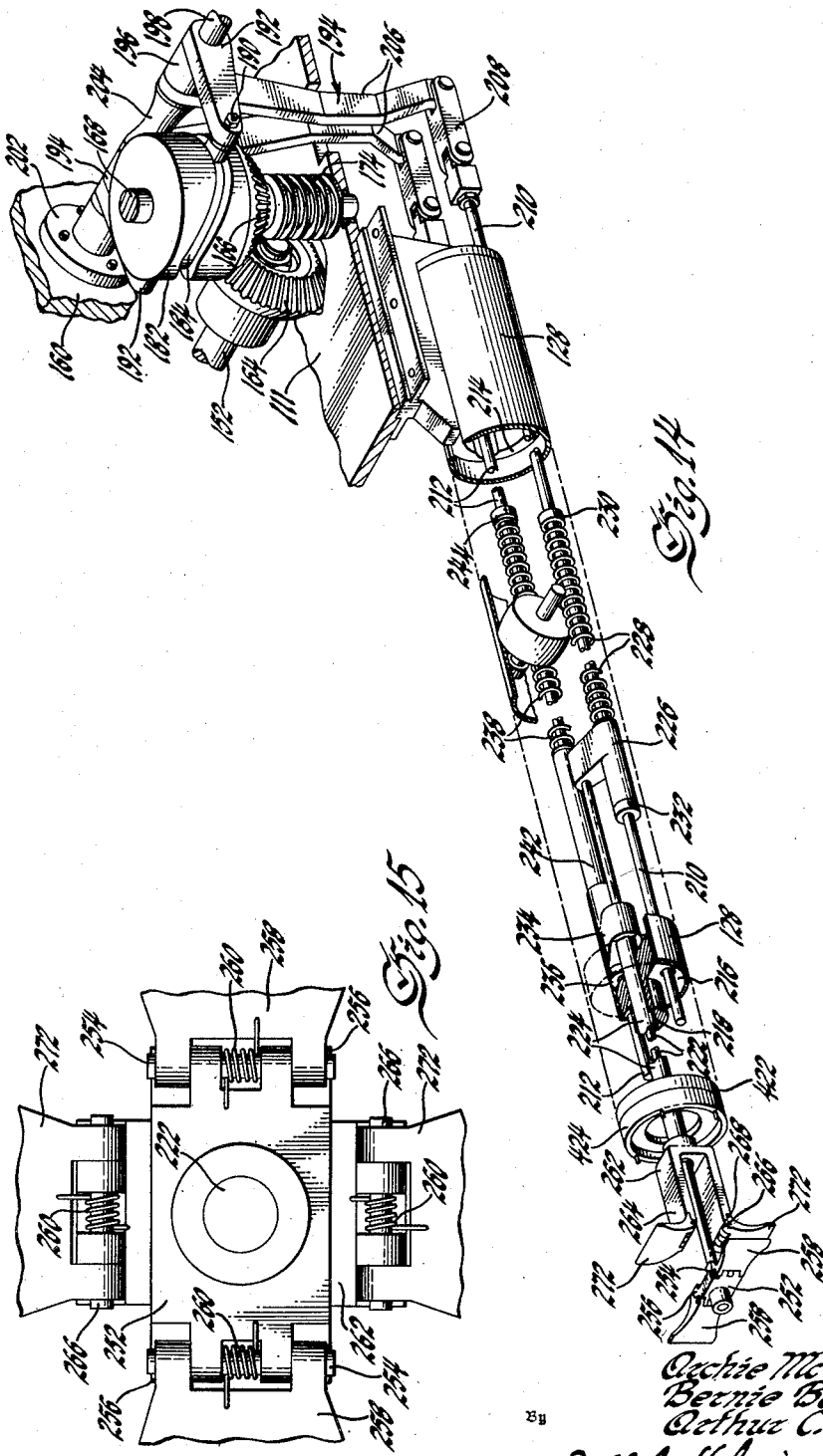

United States Patent Office 2,696,768
Patented Dec. 14, 1954

2,696,768

BELLOWS FOLDING MACHINE

Arthur C. Mickey, Archie McMillan, and Bernie Beeker, Saginaw, Mich., assignors to General Motors Corporation, Detroit, Mich., a corporation of Delaware Application September 12, 1949, Serial No. 115,214

36 Claims. (Cl. 93—1)

This application relates to paper folding machinery and more particularly to a continuous bellows folding machine.

The folding machine uses strip paper stock wound on a drum or in a roll for convenience in handling and feeding into the machine. The paper strip is fed into the machine where a pair of concentric cylindrical formers form the flat strip of paper up into a tube and a pair of rollers seal the edges as they meet in the formers. The paper tube is then continuously fed over opposed pairs of internal formers which alternately move outwardly and longitudinally to form the bellows pleats and insert them between the faces of fingers of opposed pairs of external formers which are moving together to pinch the paper and at the same time moving longitudinally to move the tube and bellows continuously through the machine.

The object of this invention is to provide a continuous bellows forming machine wherein a paper tube is formed into an alternately pleated bellows by outwardly and longitudinally moving internal formers which cooperate with longitudinally movable fingers.

Another object of the invention is to provide a bellows forming machine, a pair of tube forming guides having an open end tube to receive a flat strip of material and a cylindrical end to discharge the formed tube with internal formers positioned within the tube at the end of the cylindrical formers and being driven by means extending through the formers to the open end and connected to the motor.

Another object of the invention is to provide in a bellows folding machine internal formers pivotally mounted on reciprocating drive means formed substantially radial to form bellows pleats in a paper tube.

These and other objects of the invention will be apparent from the following description and drawings of a preferred embodiment of the invention.

Figure 1 shows a partial side view of the continuous bellows folding machine.

Figure 2 is a partial perspective view of the strip of material showing the stages of forming the bellows.

Figure 3 is a partial plan view of the machine.

Figure 4 is a partial enlarged view showing the glue applicator.

Figure 5 is a sectional view of Figure 4 on the line 5—5 with parts broken away.

Figure 6 is an enlarged partial sectional view of Figure 1 on line 6—6.

Figure 11 is an enlarged partial side view of the pleat forming mechanism.

Figure 12 is a partial sectional view on line 12—12 of Figure 11.

Figure 13 is a partial sectional view of Figure 11 on line 13—13.

Figure 14 is a perspective view showing the internal formers and their drive mechanism.

Figure 15 is a partial detail view with parts in section of the internal formers.

Figure 7:
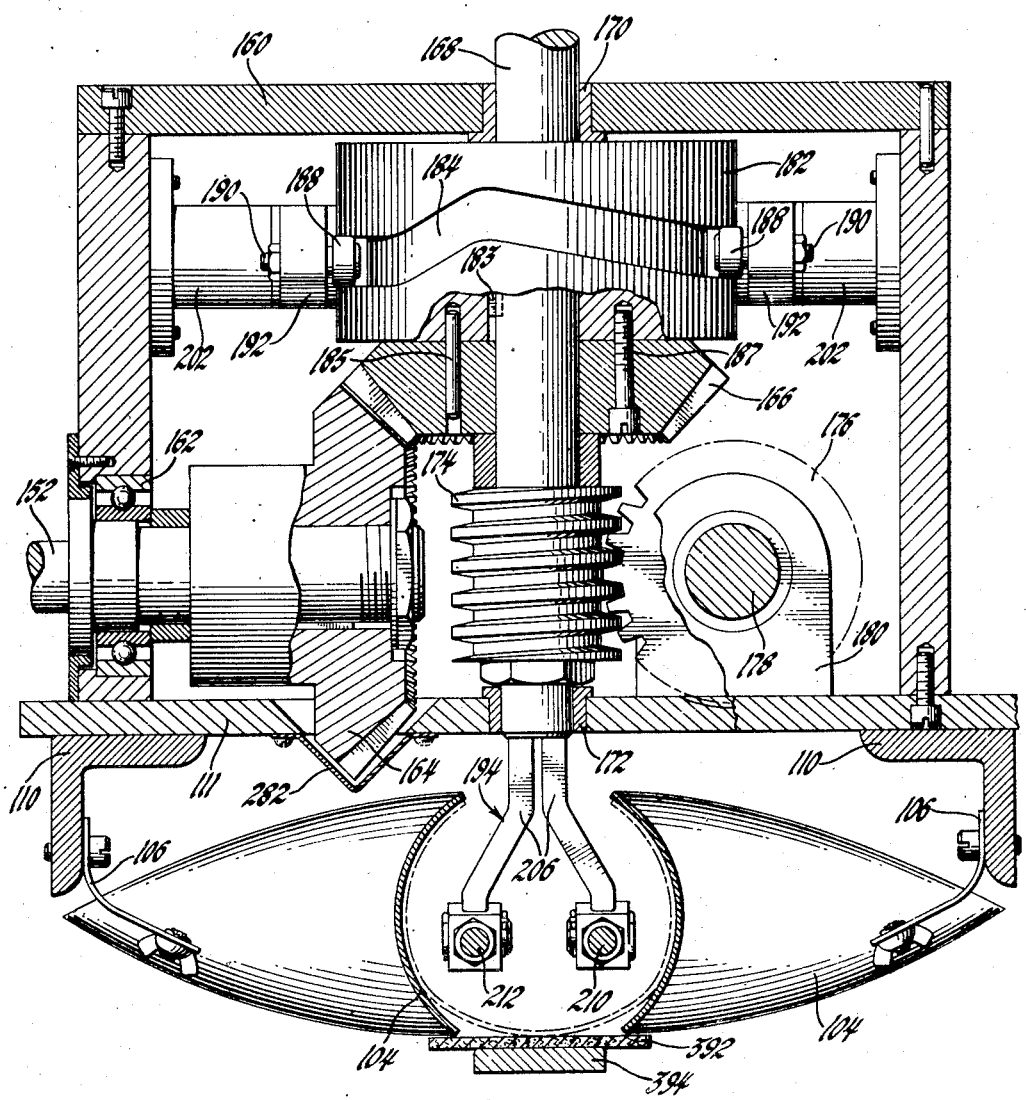
Figure 7 is an enlarged partial sectional view of Figure 1 on line 7—7 with parts broken away.

The continuous bellows forming machine of this invention employs paper strip material conveniently wound in a roll 20 and mounted on a suitable shaft 22 rotatably mounted on the support 24. The paper strip material 26 is fed by a power-driven roller 28 driven by a chain 30, which is connected to the other power-driven feed mechanism of the machine that will be described later. The power-driven drum 28 is mounted on the legs 32 of a support table 34 on which the machine is mounted. The table may have central legs 36, and has legs 38 at the other end of the table 34. An idler drum 40 is mounted on the outside of the legs 38 to guide the paper strip at the rear end of the table 34. While the strip of sheet material is passing between the drums 28 and 40 the paper is conditioned to the proper humidity for folding. This is accomplished by means of suitable heating and humidifying chambers through which the paper passes. The paper strip leaves the drum 40 and goes to the top of the table over the drum 42 which is suitably mounted on the top of the table 34 by the support 44.

When the paper strip material 26 leaves the drum 42 it passes between a guide roll 46 and a guide plate 48 mounted on table 34 by means of supports 50. As best shown in Figures 4 and 5, the guide roll 46 is mounted on a shaft 52, which is secured in the supports 50 by means of the set-screw 53. The roll 46 is rotatably mounted on the shaft 52 by means of a bushing 54, which is also secured in the roll 46 by suitable means, such as a set-screw 55. The guide plate 48 is adjustably mounted on the supports 50 and is secured in place by clamping screws 56. At one side of the guide plate an axial guide platen 60 is mounted by means of an angle 61 on arm 62 which is secured to the guide plate support 50. An edge guide 63 is adjustably secured to the platen to hold the edge of the paper relative to the glue nozzle. The axial guide platen 60 has a lateral extension 64 which provides a support for the post 66 on which the block 68 is adjustably mounted. A rod 70 is rotatably and adjustably mounted in the aperture in the block 68 offset from the post 66. The rod 70 supports a glue nozzle 72 which has a control handle 78 which operates the valve, not shown. The handle 78 is actuated through a spring 80 by a solenoid 82 mounted on a support 86. The solenoid also has a return cushion spring 84.

The glue nozzle 72 is supplied with glue from a pressurized container 92, which has a compressed air connection 94 and a flexible hose 96 which leads to the glue nozzle 72 and is controlled by the valve 78.

The paper is also sprayed very lightly with oil, such as light machine oil, by the spray nozzle 98, which is suitably connected by flexible conduits, not shown, to oil supply tanks and compressed air.

Figure 8:
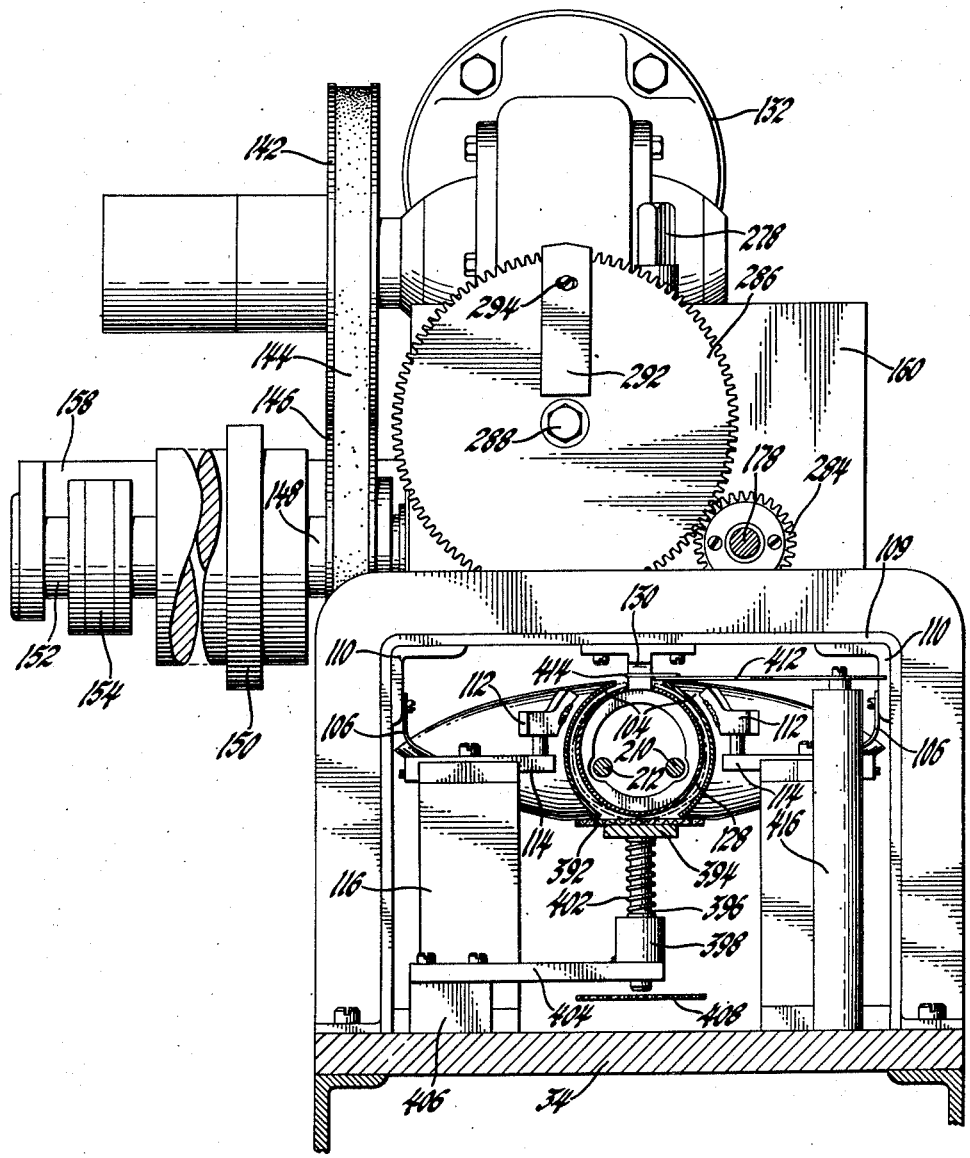
Figure 8 is an enlarged partial sectional view of Figure 1 on line 8—8.
Figure 9:
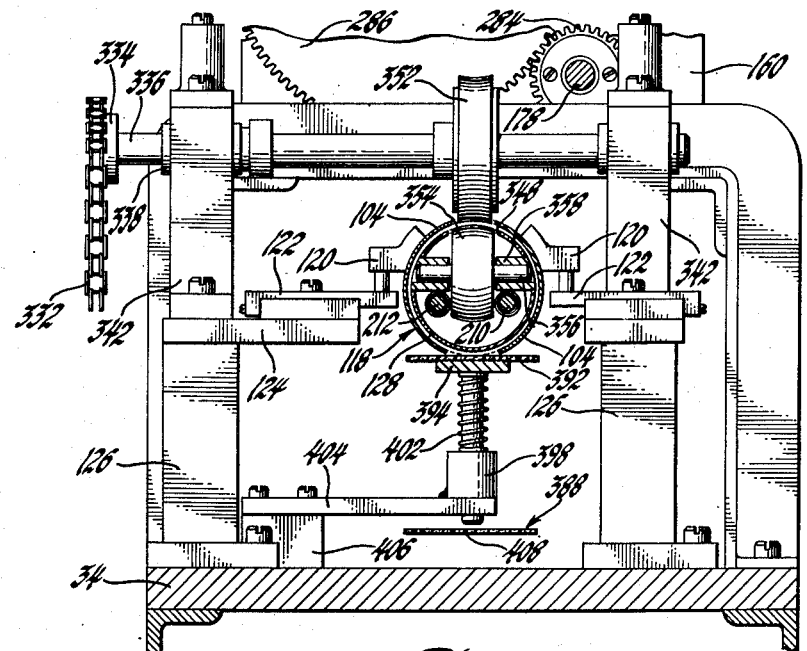
Figure 9 is an enlarged partial sectional view of Figure 1 on line 9—9.

The paper strip 26 then passes into the open end 102 of the outside formers. As best shown in Figure 6, the outside formers 104 are arranged concentrically about the axis of the machine, and are supported by tongues 106, which are secured to the vertical supports 108, which have an integral horizontal support section 109 to stiffen this frame-work. At the inner corners of vertical supports 108 and horizontal support 109 a longitudinal angle iron 110 is located to provide support for the raised platform 111. The outside formers 104 generally converge to a cylindrical shape toward the forward end of the machine as shown in Figure 8. At this midpoint the outer cylindrical formers are supported by ears 112 adjustably and pivotally secured by bracket 114 to the posts 116 which are mounted on the table 34. Near the forward end of the machine as shown in Figure 9 the forward end 118 of the external formers 104 has a partial cylindrical shape with a space at the top and at the bottom between the former parts for a brace to be later described. The forward end 118 of the formers 104 has a similar pair of ears 120 pivotally and adjustably supported by the arm 122 on the offset 124 secured to post 126 which is supported on the table 34.

The interior former 128 is illustrated in section in Figures 8 and 9, and extends from the central region of the external formers 104 to the forward end 118. The internal former 128, which has a cylindrical shape and is hollow through its length, is mounted on the rear end by a bracket 130 which is secured to the under side of the horizontal support section or platform brace 109 for the platform 111. The bracket 130 is secured to the rear end of the inner cylindrical former and provides the only support for this element which extends forward and outward in the nature of a cantilever beam.

The machine is driven by an electric motor 132 mounted on a reduction gear housing 134. The reduction gearing, though not shown, may be a Reeves device consisting of a worm reduction gear and a V-belt pulley where the spacing between the sleeves is controlled to vary the effective diameter of the pulley. The reduction gear housing is slidably mounted on support rods 135 mounted on forward brackets 136 and on rear brackets 137 secured to angle irons 110. A threaded rod 138 shown in Figures 1 and 6 is mounted between the support rods 135 and is threaded to the reduction gear housing 134 and rotatably secured in the support bracket 137. A hand wheel 140 is fixed on the end of the threaded rod 138 and is rotated to adjust the position of the reduction gear and its pulley 142 to adjust the tension in the belt 144. The motor 132 drives an adjustable sheave pulley 142 through the reduction gearing in the reduction gear housing 134. As also shown in Figure 3 the pulley 142 is connected by a V-belt to the pulley 146 which is mounted on a sleeve 148 connected to one side of a magnetic clutch 150. The other element or side of the magnetic clutch 150 is mounted on shaft 152. The electrical current for controlling the magnetic clutch is supplied to the magnetic clutch by a commutator 154 mounted on the shaft 152 and the brushes 156 mounted on a suitable support 158.

The shaft 152 extends through the magnetic clutch 150 and the sleeve 148 to the gear-box 160. The platform 111 provides the bottom for the gear-box. As best shown in Figures 7 and 14, the shaft 152 is suitably mounted in a bearing 162 in the side of the gear-box and has a bevel gear 164 secured to the end thereof. The bevel gear 164 meshes with a driven bevel gear 166 mounted on a vertical shaft 168 supported in a suitable bearing 170 at the top of the gear-box and a bearing 172 at the bottom of the gear-box. A worm wheel 174 is mounted on the shaft 168 below the driven gear 166 and meshes with gear 176 mounted on the shaft 178 which is rotatably supported by the bearing block 180. A cylindrical cam 182 is fixed to the shaft 168 by means of a key 183. The gear 166 is fixed to the shaft by securing it to the cam 182 by means of a pin 185 and screws 187. The cam has a cam groove 184 which is shaped to provide the proper motion for the internal formers. The rollers 188 are rotatably mounted on pins 190 which are suitably secured to the arms 192. The rollers 188 are positioned within the cam groove 184 and raise and lower the arms 192 in accordance with the configuration of the cam groove. The arm 192 is one portion of a bell crank lever 194 which is best illustrated in Figure 14. The arm 192 is connected to a bushing 196 which is mounted on a pivot shaft 198 supported in suitable bearings 202 mounted on the inside side walls of the gear-box 160. A spacer 204 is positioned on the shaft 198 between the bell crank levers 194 to maintain the levers in proper spaced relation. The other arm 206 of the bell crank lever extends downward through an aperture in the base 111 of the gear-box. The arms 206 are connected by connecting rods 208 to the cross head rods 210 and 212. The cross head rods 210 and 212 are reciprocally mounted in bearings in a rear bulkhead 214 and the forward bulkhead 216 in the cylindrical former 128. The forward bulkhead 216 also has a central bearing 218 to slidably support the horizontal internal former operating rod 222 and the concentrically mounted vertical internal former operating sleeve 224. The former operating rod 222 is connected to the left cross head rod 210 by an arm 226 which is fixed to the operating rod and is slidably mounted on the cross head rod 210. The arm 226 is resiliently held in position on the cross head rod 210 by a coil spring 228 which abuts on the collar 230 and resiliently holds the arm 226 in contact with the collar 232. Similarly, the operating sleeve 224 is secured to an arm 234 which is slidably mounted on the right cross head rod 212. The arm 234 is resiliently held in position against a collar 236 by a coil spring 238, which acts through a spacer sleeve 242 and is secured to the cross head rod 212 by a collar 244. The pintle bracket 252 is secured to the outer end of the internal former operating rod 222, and has a pair of vertically directed pintles 254 and stop elements 256. The trapezoidal shaped internal formers 258 are pivotally mounted on the pintles 254, and have a rear portion which abuts the stop 256. As shown in Figure 15 coil springs 260 wrapped about the pintle tend to urge the formers against the stop and thus hold the formers in radial position. The end of the vertical former operating sleeve 224 is spaced from the end of the operating rod 222 to allow for relative movement. Thus the pintle bracket 262 on the end of the operating sleeve 224 has a pair of axial extensions 264 spaced apart the width of the horizontal former bracket 252, so that this horizontal bracket may pass within the vertical bracket 262. At the end of the extensions 264 horizontal pintles 266 and stop portions 268 are provided in order to pivotally mount the vertical pleat formers 272. The vertical pleat formers 272 have light coil springs 260 wrapped about the pintle in the same manner as shown in Figure 15 on the horizontal formers 258, to maintain the vertical formers 272 in extended or radial position.

The vertical shaft 168 extends from the top of the gear-box 160 and terminates in a squared end 278, which may receive a hand wheel crank which is used to move the machine parts by hand in order to make repairs and adjustments. The platform 111 acts as the base portion of the gear-box and is suitably apertured to provide clearance for the gear 164. A sheet metal cover 282 fits over this aperture and has suitable clearance about the gear to enclose the gear and prevent loss of oil. The shaft 178 extends outwardly through the forward side of the gear-box 160. A gear 284 is fixed to the shaft just outside the front face of the gear-box 160. A large gear 286 is pivotally mounted on a stub shaft 288 which is secured to the front face of the gear-box 160. A V-shaped cam 292 is secured to the gear 286 by adjustable fastening means 294, and is employed to actuate a paint sprayer to mark the paper tube to indicate the length of bellows to be employed in each filter unit.

Figure 10:
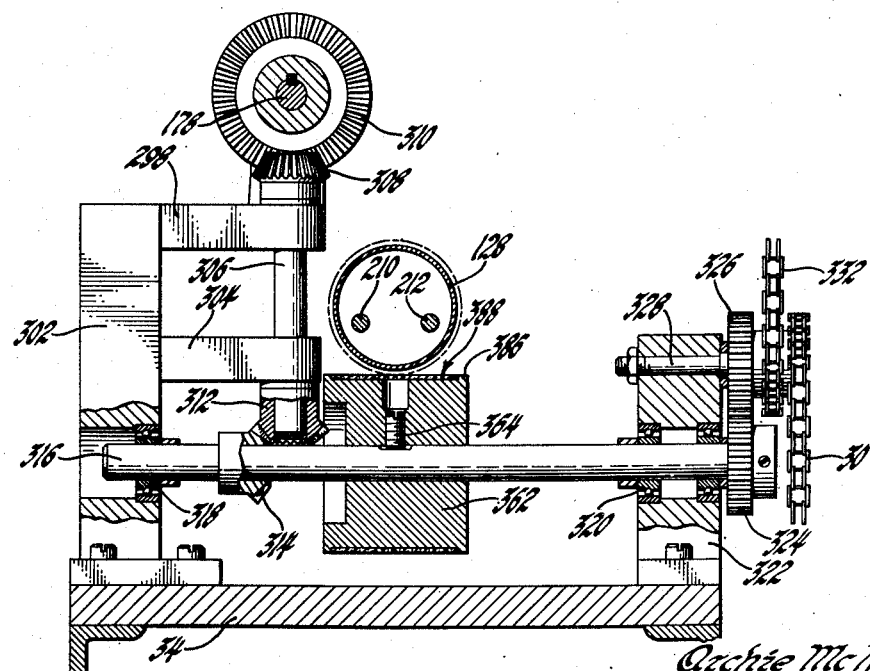
Figure 10 is an enlarged partial sectional view on the line 10—10 of Figure 1 with parts broken away.

The shaft 178 extends forward parallel with the cylindrical formers to a bearing support 296 which is mounted on the laterally extending platform 298 secured to the post 302 which is supported on the table 34. As best shown in Figure 10, the upper laterally offset platform 298 and the lower laterally offset platform 304, both of which are secured to the post 302, have vertical bearing apertures adjacent the outer edge for a vertical transfer shaft 306. The transfer shaft 306 has a bevel gear 308 at the outer end meshing with a bevel gear 310 keyed to the shaft 178. At the lower end of the transfer shaft 306 the bevel gear 312 meshes with the bevel gear 314 secured to pulley shaft 316. The pulley shaft 316 is rotatably mounted in suitable bearings 318 in the post 302 and at the other side extends through bearings 320 in post 322. On the outboard side of the post 322 a gear 324 is fixed to the shaft 316. The gear 324 meshes with a combination gear and dual sprocket member 326 rotatably mounted on stud shaft 328, which is also mounted on the post 322. The chain 30 previously mentioned runs in the outer sprocket of the member 326 and extends downwardly to rotate the drum 28 which draws the paper strip material from the roll 20. The inner sprocket of member 326 has a chain 332 running thereon. The chain 332 extends upwardly to drive the sealing rollers as best shown in Figure 9. It will be noted that due to the fact that sections 9 and 10 are taken in the opposite direction for clarity the drawing is reversed and thus chain 332 appears on opposite sides in these two figures. The chain 332 meshes at its upper end with a sprocket wheel 334 fixed to a cross shaft 336 mounted in bearings 338 at each end supported on the blocks 342, which are suitably secured on top of the posts 126. At the mid-section of the machine the outer cylindrical formers 104 are spaced apart at the top as best shown in Figure 9, and the internal cylindrical former has an aperture 348 in the top surface. The sealing wheel 352 is drivingly secured to the shaft 336 and has a concave face having a curve to conform with the cylindrical curvature of the paper tube being formed by the machine. The inner sealing wheel or idler wheel 354 is rotatably mounted on a shaft 356 rotatably secured in bearings 358 secured to the inside surface of the inner cylindrical former. The outer surface of the idler 354 has a convex curvature to conform with the idler curvature of the tube being formed by the machine.

The shaft 316 also has a pulley 362 secured thereto by a set screw 364. Adjacent the rear end of the machine as shown in Figure 1, a pair of pads 366 are secured to the opposite sides of the table 34 and have a bearing support member 368 slidably mounted on each side thereof to support the shaft 372. The bearing support members 368 are adjustably secured to the pad 366 by screws 374 which extend into slots in the pad 366. The lateral adjusting movement of the bearing supports 368 is controlled by screws 376 secured to or engaging the bearing supports and extending through abutments 378 secured to the table top 34. The lock nut 382 on the bolt 376 engages the abutment 378 and provides means for adjusting the position of the bearing supports 368. The transverse shaft 372 centrally supports rear pulley 384. Both the rear pulley 384 and the front pulley 362 have a ridge 386 at each edge to hold the belt 388 on the pulleys. The belt extends substantially the full length of the cylindrical formers 104, and the top reach 392 of the belt is positioned centrally below the lower centrally positioned space between the halves of the cylindrical formers 104. Over the forward portion of the belt which extends under the inner cylindrical former a pressure pad 394 is resiliently held in contact with the under side of the upper reach 392 of the belt to hold the belt in contact with the paper tube surrounding the internal cylindrical former 128. The pressure pad 394 is resiliently supported at both ends to evenly distribute the pressure on the belt. One of the pressure pad supports is shown in Figure 8 and includes a pin 396 secured at the top to the pad 394 and slidably mounted for vertical movement in a bushing 398. A spring 402 surrounds the pin 396 and abuts against the pressure pad and the bushing 398 to resiliently maintain the pressure pad in contact with the lower face of the belt reach 392. The bushing 398 is supported on an arm 404 which has an aperture at one end in alignment with the aperture in the bushing and is secured to a support block 406 at the other end to hold the arm above the lower reach 408 of the belt. The two springs evenly distribute the pressure on the pad 394. One spring 402 is employed at the read end of the pad adjacent the support 116 and a second spring 402 is employed adjacent the forward end of the pad 394 behind the post 126, the rear spring being shown in cross sectional view in Figure 8, and the forward spring in the cross sectional view in Figure 9. A guide 412 having an end finger 414 is employed to properly position the seam of the tube before it passes between the sealing rolls. The guide 412 is adjustably secured to the post 416.

At the forward end of the inner cylindrical former 128 an extension portion 422 having the same external diameter as the former is secured to the end of the former 128 and is employed as an anchorage for the end bearing support 424 which is secured thereto by suitable means, such as screws 425. The bearing support 424 has a bearing 426 in a central aperture therein. The forward internal pleat former operating sleeve 224 is reciprocally mounted within bearing 426. The pintle bracket 262 on the end of sleeve 224 has an internal bushing 428 to provide a bearing for the horizontal internal pleat former operating rod 222. An extension ring 432 on the end of the bearing support 424 provides an anchorage for the guide cage 434. The guide cage provides a guide for the rectangular interior shape formed during the pleating of the cylindrical paper tube to form the bellows. As best shown in Figure 11, the guide cage 434 has an initial portion 436 having a slightly larger size than the paper tube, so that it tends to form the cylindrical tube into a rectangular form for the successive action of the internal pleat formers. Then the cage has an inwardly tapering section 438 shaped to conform with the inward movement of the inner edge of the pleats. The remainder of the cage consists of a straight section 440 of extended length which guides the bellows during the creasing and setting operation. The section 440 of the cage has the same dimensions as the internal aperture in the pleated bellows. The top and bottom rods may be connected by integral diagonal braces 442, which may be welded together at their crossing point. The wire rods of cage 434 may also be stiffened by employing a pair of spacer plates 444 secured to the cage and together by a rod 446.

The external formers 448 which cooperate with the internal formers to form the pleats are supported on the table 34 by the annular support 452 mounted on posts 454. There are four external formers 448 arranged in a vertical pair and a horizontal pair which cooperate respectively with the vertical and horizontal internal formers. Each of the formers 448 is mounted on a support consisting of a pair of arms 456 secured by suitable means, such as screws, to the internal abutment 458 of the annular support 452. A tongue 460 having half the width of the arms 456 extends from each arm. The arm extension 462 has a similar tongue 464 having half the width of the arm extension. The tongues 460 and 464 are adjustably secured together by screws 466 which pass through a slot in the tongue 464 and are threaded into the tongue 460 so that the extension 462 is in alignment with the arm 456. A bearing 468 at the inner end of the arms 456 and a bearing 470 at the outer end of the arm extensions 462 provide a support for the rotatable shafts on which the external formers rotate.

The external formers are driven from the shaft 178 which extends forward through the bearing support 296 and the bearing 474 on the annular support 452. At the end of shaft 178 a gear 476 fixed thereto meshes with a gear 478 fixed to vertical shaft 480 which is rotatably mounted in the pair of bearings 468 in the arms 456 on the left side of the machine and immediately thereunder. The shaft 480 terminates at the other side of the arms 456 and has a gear 482 fixed to the end which meshes with the gear 484 fixed to the end of the shaft 486 extending through the bearings 468 in the lower pair of arms 456. At the other end of shaft 486 a gear 488 is fixed, which meshes with the gear 490 fixed to the end of shaft 492 which is mounted in the vertical pair of bearings 468 in the pair of arms 456 on the right side of the machine. The other end of shaft 492 is secured to gear 494 which meshes with gear 496. The gear 496 is secured to the end of shaft 498 which is rotatably mounted in the top pair of bearings 468. The bearings 470 in each pair of forward extensions have an idler shaft 500 mounted therein. A pair of sprocket wheels 502 are mounted on each idler shaft 500 just inside each arm 462 and on each of shafts 480, 486, 492 and 498 within each of the arms 456. A pair of chains 504 and 506 are mounted on each pair of sprocket wheels 502. Metallic fingers 508 are secured on each link of the chains and extend transversely between the chains, so that they extend radially from the chain at all times as shown in Figure 11.

An electric heating pad 512 is secured just outside of each of the sets of external formers and has a pair of tongues 514 for securing the heating pad to the annular support 452 and a pair of tongues 516 extending forward to secure the heating pad to a strut 518 extending between each of the adjacent heating pads. The external formers are heated by these electric heating elements to permanently set the curves in the thermo-setting resin-impregnated paper.

The machine operates to form and fold the strip of paper stock material 26 through the successive stages illustrated in Figure 2 of the drawing. The paper is drawn from the roll 20 by the power-driven drum 28 and is fed across the full length of the machine beneath the table to the idler roller 40. While the paper is moving underneath the table its moisture content may be adjusted for proper folding. Thus it is advisable to employ suitable heating chambers and humidifying chambers beneath the table. The paper may be dried by employing electric heat lamps or other heating means. The paper may be further moistened by employing a vapor chamber or spray devices. The paper then passes to the top of the table where the strip of sheet material 26 changes direction over the roll 42 and enters into the roll 46 and the guide plate 48 where the paper is positioned and flattened to enter the machine. Just beyond roll 46 a strip of adhesive material is applied to one edge of the paper by the adhesive applicator or nozzle 72. The adhesive is fed through a nozzle onto the paper by air pressure. The flow of adhesive is regulated by a valve handle 78 which is actuated by an electric solenoid 82 connected to the main electric circuit of the machine or a separate electric switch. Thus whenever the motor is energized to move the paper through the machine, the glue applicator is open to apply adhesive to the edges of the paper. The paper then passes through the machine and enters the open end of the cylindrical formers 102. At this point a spray nozzle 98 applies a light mist or vapor of oil to the paper to act as a lubricant. It will be noticed that at the rear end 102 the cylindrical formers are substantially flat. As the paper moves through the formers the edges are curved upward to begin to form a cylindrical tube as shown at 526 in Figure 2. It will also be noted that the upper reach of the belt 392, though slightly spaced from the lower side of the cylindrical formers, will prevent the paper from falling through the slot at the lower edges of the cylindrical formers. As the paper strip material progresses further into the cylindrical formers 104 it moves around the inner cylindrical former 128 and the outer cylindrical formers are closer to the cylindrical former 128 to form the completed tube 528. The edges of the paper in meeting are held by the guide 412 so that one edge is always positioned below the glued edge. The tube is also contacted for driving the tube through the machine during this portion of its movement through the machine. The power-driven belt 388 has an upper reach portion 392 which contacts and grips the paper blank over the central region 526 to 532 (see Figure 2) to draw the paper through the machine. The spring pressure pad 394 acting on the under side of the belt resiliently holds the belt against the paper blank so that it may frictionally draw the blank through the machine.

After the paper passes the guide 412 which positions the edges of the paper blank with the glued edge on top of the unglued edge as shown at 528 in Figure 2, a sealing roller 352 cooperates with an idler roller 354 within the tube to compress the seam and set the adhesive at 530 of Figure 2.

The blank is thus formed into a tube and passes out of the outer cylindrical tube formers 104 and shortly thereafter off the interior tube former 128 and onto the enlarged rectangular portion 436 of the guide 434. As shown at 534 of Figure 2 this enlarged portion 436 of the guide flattens the surface of the tubular blank into a somewhat rectangular shape. The tube thus moves forward where the pair of vertical internal formers 272 engage the internal flattened portions of the tube. The operating sleeve 224 then moves the fingers 272 forward forming a pair of vertical pleats 536. The fingers 272 are shown in Figure 11 in a position just starting to form a pair of vertical pleats. The internal fingers will move forward and at the same time another external finger 508 will move around and grip the last formed vertical pair of pleats 538. The internal fingers 272 will push the pleat 536 up against this external finger and be withdrawn. When the internal fingers 272 are withdrawn they pivot inward about the pintle 266 to clear the pleat being formed and the next external finger moving inwardly and longitudinally to grip the pleat. Between the formation of pleat 538 the horizontal fingers 258 have alternately moved forward and formed the intermediate horizontal pleat 540 which is shown in Figure 2. The horizontal pleats are formed by the internal horizontal formers acting against the external formers and creased by the external formers in the same manner. Thus the cooperating pairs of horizontal internal and external pleat formers and the cooperating pairs of vertical internal and external pleat formers alternately form horizontal and vertical pleats to produce a continuous folded bellows.

The creases of each of these pleats are pressed and hardened by the external pleat formers which move together as they move from the circular end portion of their path to the straight portion of the path. The external fingers are also heated by the electric heating pad 512 so that they may permanently set and harden the crease by heating the thermo-setting resin-impregnating paper. The complete bellows is thus fed out of the other end of the longitudinally moving external pleat formers 508 in a continuous strip.

It will be understood that in the foregoing description of the preferred embodiment of the invention, the terms "horizontal" and "vertical" are used for convenience in referring to parts shown in the horizontal or vertical position. It will be appreciated that the machine may be in any other position and have a different number of sides and thus that these terms describe the relative angular relationship between the parts.

It will be apparent that many modifications of the above described specific embodiment of the process and machine for forming the bellows may be made within the scope and spirit of the invention as defined in the appended claims.

We claim:

1. In a folding machine, a guide having longitudinally extending portions to guide a tube for axial movement, means to move opposed portions of the tube outwardly from the tube axis to form a pair of opposed individual pleats without expanding intermediate portions, means to move said tube a predetermined axial distance, and means to move other opposed portions of the tube circumferentially angularly displaced from said first mentioned opposed portions outwardly from the tube axis without expanding intermediate portions to form a second pair of opposed individual pleats angularly disposed and axially spaced from said first pair of pleats.

2. In a folding machine for forming pleats in a tube, guide means for a tube, means to continuously move said tube longitudinally along the tube axis on said guide means, one folding means on one side of said tube moving longitudinally at substantially the speed of said tube, other folding means on the other side of said tube moving longitudinally slower than said tube, and actuating means connected to both of said folding means to drive both of said folding means in conjunction to engage substantially directly opposed sides of a single pleat portion of the tube in spaced relation to form a pleat and to withdraw said one folding means to disengage said tube and to reengage said tube to form a series of pleats as the tube moves through the machine.

3. In a folding machine for folding a blank, a support having a folding station, a reciprocating former entering the folding station at one end of the reciprocation, means to reciprocate said former, a rotating former having a plurality of surfaces, means rotating said rotating former to move successive surfaces into said folding station, said reciprocating former reciprocating in timed relation with the rotation of said surfaces on said rotary former, said reciprocating former and said surfaces on said rotating former moving closer together and cooperating to engage opposite sides of one pleat portion of the blank to fold a pleat between them, and drive means positively interconnecting said reciprocating and said rotating means.

4. In a folding machine, a mandrel supported at one end, means for continuously forming a tube on said mandrel, a drive mechanism engaging the tube and drawing the tube through the tube forming means and continuously moving the tube off the other end of said mandrel, internal formers reciprocally mounted within the tube at said other end of said mandrel to engage the moving tube, and means engaging the tube in cooperation with said formers to pleat said continuously moving tube.

5. In a folding machine, a first opposed pair of internal formers mounted for reciprocation, a second opposed pair of internal formers located substantially coaxially with said first opposed pair of internal formers and located circumferentially at an angle to said first opposed pair of internal formers, a drive mechanism to sequentially reciprocate said first and second pair of internal formers, a first opposed pair of external formers substantially radially aligned with said first pair of internal formers, a second opposed pair of external formers substantially radially aligned with said second opposed pair of internal formers, and drive means driven in timed relation with said drive mechanism to move said external formers longitudinally in cooperation with said internal formers to form alternate opposed pairs of pleats angularly displaced from each other.

6. In a bellows folding machine, a frame, a guide mechanism having an axis to guide a tubular blank along the axis of the tubular blank, internal formers mounted on said frame within the tubular blank for radial outward movement and located coaxially with said guide mechanism, external formers mounted on said frame externally of the tubular blank for radial inward and axial longitudinal movement and located coaxially with said guide mechanism, adjacent internal formers and external formers positioned to cooperatively engage opposite sides of a pleat portion of the tubular blank to form pleats, and a drive mechanism operably connected to said internal and external formers to move said internal and external formers in timed relation to pleat the tube.

7. In a bellows folding machine, a frame, a guide mechanism mounted on said frame and having a longitudinal axis to guide a tubular blank along its axis, a driver mounted on said frame to continuously move the tubular blank axially along said longitudinal axis of said guide mechanism, internal and external formers located internally and externally of the tubular blank mounted on said frame coaxially of said guide mechanism for movement to engage internal and external surfaces of the blank, and a drive mechanism to sequentially move said formers to engage the moving tubular blank at substantially directly opposed points to consecutively form the pleats of a series of individual transverse bellows pleats in the tubular blank.

8. In a bellows folding machine, a frame, a guide mechanism having a longitudinal axis to guide a tube along the axis of the tube with the tube axis parallel to the axis of said guide mechanism, a driver mounted on said frame to move said tube axially along said longitudinal axis of said guide mechanism, a first pair of internal formers mounted for movement on said frame and located adjacent the axis of said guide mechanism and a second pair of internal formers mounted for movement on said frame and located adjacent the axis of said guide mechanism and circumferentially angularly displaced with respect to said first pair of internal formers, a first pair of external formers and a second pair of external formers mounted for movement on said frame and located substantially radially outwardly of said first and second pair of internal formers respectively, a first drive to move said first internal and external formers to form an individual first bellows pleat in said tube, a second drive to move said second internal and external formers to form an individual second bellows pleat adjacent said first bellows pleat and means coordinating said driver, said first drive and said second drive in timed relation.

9. In a bellows folding machine, a frame, a guide mechanism having a longitudinal axis mounted on said frame to guide a tube with the tube axis parallel to the axis of said guide mechanism, internal formers mounted on said frame and within said guide mechanism, means to move said internal formers longitudinally and outwardly with respect to the axis of said guide mechanism to engage a portion of the internal surface of the tube, external formers mounted for movement on said frame outside of the tube, means to move said external formers inwardly toward the axis of said guide mechanism to a position to engage an opposite portion of the external surface of the tubular blank in cooperation with said internal formers, means to withdraw and return said internal formers, means to move said external formers longitudinally along the axis of said guide mechanism, and means to withdraw and longitudinally return said external formers to the original position.

10. In a bellows folding machine, a frame having an axis, internal formers movably mounted on said frame within a tubular blank, first drive means on said frame to expand said internal formers away from said axis to contact a portion on the inside of the tubular blank to form pleats in said blank, external formers movably mounted on said frame outside of the tube, second drive means on said frame having movement coordinated with said first drive means to move said external formers inwardly toward said axis to contact a portion on the outside of the tubular blank substantially directly opposite the portion on the inside to cooperate with the internal formers in forming pleats, to move said external formers longitudinally of said axis with the blank, and to move said external formers axially closer together during movement with the blank to compress the crease in the pleats and to move the blank.

11. In a bellows folding machine, a cylindrical tube guiding mandrel, means to support said mandrel at one end, means to continuously move said tube off the other end of said mandrel, internal transverse individual pleat formers having a tube engaging portion mounted adjacent and in substantial alignment with said other end of said mandrel and within the perimeter of said mandrel in a position within said tube, means on said other end of said mandrel to change the shape of the moving tube for cooperation with said tube engaging portion of said internal formers before the tube reaches said internal formers, and means to move said formers outwardly to engage the inside of said tube after its shape is changed by the last named means.

12. In a folding machine, a frame, a mandrel supported at one end on said frame, means on said frame to form a tube about said mandrel between the supported end and the free end, means on said frame to feed the tube off the free end, reciprocating drive means in said mandrel, a pair of internal formers pivotally mounted on the free end of said drive means within the perimeter of said mandrel, external formers, endless means mounted for rotation on said frame outside the perimeter of said mandrel, said external formers being secured to said endless means in alignment with said mandrel to move a former inwardly to cooperate with each forward movement of said reciprocating internal formers and to move said former closer to the adjacent former to compress each pleat as it is formed and to support and hold the pleated tube leaving the mandrel.

13. In a folding machine, a first pair of internal formers, a second pair of internal formers substantially normal to said first pair of internal formers, means to reciprocate said formers along an axis of reciprocation, means to urge said internal formers transversely outwardly from said axis of reciprocation, a first pair of external formers positioned outwardly from said axis adjacent said first pair of internal formers, a second pair of external formers positioned outwardly from said axis adjacent said second pair of internal formers, means to move said external formers longitudinally in cooperation with said internal formers to form alternate pleats normal to each other.

14. A method of forming a continuous bellows from a tubular blank in a folding machine having a station consisting of the following steps, expanding outwardly a first pair of opposed portions of said tube and simultaneously inwardly moving a first pair of intermediate opposed portions of said tube in transverse alignment with the two opposed portions moved outwardly at the station to form a first transverse pleat in the tube, moving the tube longitudinally of its axis to move the first transverse pleat out of said station and to position another tube portion at the station, and outwardly moving a second pair of opposed portions spaced from said first pair of opposed portions both longitudinally and circumferentially and simultaneously inwardly moving a second pair of intermediate opposed portions of said tube in transverse alignment with the second pair of opposed portions moved outwardly at the station to form a second transverse pleat circumferentially angularly spaced and axially spaced from said first transverse pleat.

15. A method of forming a continuous bellows in a folding machine having a folding station comprising the steps of forming a tubular blank, moving the tubular blank longitudinally along its axis to the folding station, forming an elongated transverse pleat in one direction at said folding station, moving said blank longitudinally along the axis of the tubular blank to present another portion at said folding station, forming an elongated transverse pleat circumferentially spaced from the first formed pleat, moving said blank longitudinally along the axis of the tubular blank to present another portion at said folding station, forming an elongated transverse pleat circumferentially spaced from the last formed pleat, and individually compressing each of said completed pleats to set the crease when the pleated tube moves past said folding station.

16. In a folding machine for folding a blank, a first former mounted for movement through a cycle, a group of second formers mounted for movement through a cycle and drive means moving and guiding said first former through a cycle for each second former and said group of second formers through a cycle to move said first former toward each former of said group of second formers at a point in its cycle to cooperatively engage the blank between a first and second former to form a fold between adjacent second formers, additional guide means for said group of second formers to guide said group of second formers to move closer together to grip and compress the folds between said second formers and set the crease therein.

17. In a folding machine, a support, a mandrel having a longitudinal axis and being mounted on said support at one end and having a free end, means mounted on said support for guiding a tube on said mandrel with the axis of the tube parallel with the longitudinal axis of the mandrel, a drive mechanism mounted on said support and engaging the tube to continuously move the tube off the free end of said mandrel, internal formers longitudinally reciprocally mounted on said support for reciprocating movement parallel and adjacent to the axis of said mandrel at the free end of said mandrel and for outward movement, means connected to said internal formers to reciprocate and to move the internal formers outwardly away from the axis of the tube to engage the inside of the tube during longitudinal movement of the formers with the tube and means permitting movement of the internal formers toward the axis of the tube during reverse movement of the formers with respect to the tube.

18. In a folding machine, a support, a mandrel having a longitudinal axis and being mounted on said support at one end and having a free end, means mounted on said support to guide a tube about said mandrel between the supported end and the free end with the axis of the tube parallel with the longitudinal axis of the mandrel, a drive mechanism mounted on said support and operable to feed the tube off the free end of the mandrel, a pair of internal formers mounted on said support adjacent said axis for movement outwardly away from the axis to engage opposed portions of the inside of the tube to form pleats, means connected to said internal formers to move said internal formers extending through said mandrel, a pair of groups of external formers mounted on said support and located adjacent said internal formers and adjacent and facing the outside surface of the tube to engage the outside of the tube to provide support when the internal formers form a pleat, drive means connected to said external formers to move a former of said group of external formers inwardly to cooperate with each movement of said internal formers and to move said former closer to the next adjacent former of said group to crease each pleat as it is formed.

19. In a bellows folding machine, a tube forming mandrel having a cylindrical body and a polygonal end portion, means to support said mandrel at the body end, means to guide a tube about said mandrel, means to continuously move said tube off the other end of said mandrel, internal formers located within said polygonal portion of said mandrel, and means to actuate said formers extending through said mandrel.

20. In a folding machine, a mandrel supported at one end, means to guide a tube about said mandrel between the supported end and the free end, means to feed the tube off the free end, reciprocating drive means in said mandrel, a pair of internal formers pivotally mounted on the free end of said drive means, external formers, endless means mounted for rotation, said external formers being secured to said endless means, and an actuating drive connected to said reciprocating drive means and to said endless means to move a former inwardly to cooperate with each forward movement of said reciprocating internal formers and to move said former closer to the adjacent former to crease each pleat as it is formed.

21. In a bellows folding machine, a frame having a tubular folding station, a tube forming mandrel mounted on said frame having a body portion to guide a tube to said tubular folding station, means to continuously axially move a tube off one end of said mandrel and coaxially through said tubular folding station, former means having a tube engaging portion located adjacent said tubular folding station and mounted on said frame for movement to said tubular folding station to engage the tube to form pleats in the tube, and means mounted on said frame and located between said mandrel and said former means to change the shape of said tube to conform with said tube engaging portion of said former means.

22. In a folding machine, a frame, an endless member rotatably mounted on said frame for movement in a path having a curved portion and a straight portion, a plurality of fingers radially mounted on said endless member to move over said path, said fingers being radially divergent when traversing said curved portion of said path and said fingers moving close together approaching said straight portion of said path and remaining close together when traversing the straight portion of said path, means entering between adjacent pairs of said divergent fingers at the curved portion of said path to project folds of a paper blank between adjacent pairs of said divergent fingers, and said means being completely withdrawn as the fingers approach the straight portion of said path, said fingers moving together to compress and crease the folds as the fingers approach and during the straight portion of said path.

23. In a folding machine for folding a blank, a frame, an endless member rotatably mounted on said frame for movement in a path having a curved portion and a straight portion, a plurality of fingers radially mounted on said endless member to move over said path, said fingers being radially divergent forming a large space between adjacent fingers when traversing said curved portion of said path and said fingers moving toward each other to reduce the space between adjacent fingers to substantially the double thickness of the blank when approaching said straight portion of said path and remaining close together with a small space between adjacent fingers when traversing the straight portion of said path, means entering between to project folds of a blank between adjacent pairs of said divergent fingers at the curved portion of said path and said means being completely withdrawn as adjacent fingers move closer together approaching the straight portion of the path and said adjacent fingers moving toward each other when approaching the straight portion of the path and remaining close together when traversing the straight portion of the path to compress and crease the folds.

24. In a folding machine, a frame, an endless member rotatably mounted on said frame for movement in a path having a curved portion and a straight portion, a plurality of fingers radially mounted on said endless member to move over said path, said fingers being radially divergent forming a large space between adjacent fingers when traversing said curved portion of said path and said fingers moving toward each other to reduce the space between adjacent fingers when approaching said straight portion of said path and remaining close together with a small space between adjacent fingers when traversing the straight portion of said path, folding means to project folds of a paper blank between adjacent pairs of said divergent fingers at the curved portion of said path, means to withdraw said folding means as the fingers approach the straight portion of said path, and said adjacent fingers moving toward each other to compress and crease the folds as the fingers approach and during the straight portion of said path.

25. In a folding machine, a frame, an endless member rotatably mounted on said frame for movement in a path having a curved portion and a straight portion, a plurality of fingers radially mounted on said endless member to move over said path, said fingers being radially divergent forming a large space between adjacent fingers when traversing said curved portion of said path and said fingers moving toward each other to reduce the space between adjacent fingers when approaching said straight portion of said path and remaining close together with a small space between adjacent fingers when traversing the straight portion of said path, folding means mounted on said frame for reciprocating movement, means connected to said folding means to move said folding means between each adjacent pair of fingers as they pass a point on the curved portion of said path and are radially divergently positioned to project folds of a paper blank between adjacent pairs of said divergent fingers at the curved portion of said path, means to withdraw said folding means as the fingers approach the straight portion of said path, and said adjacent fingers moving toward each other to compress and crease the folds as the fingers approach and during the straight portion of said path.

26. In a folding machine, a support having a ring-like folding station and an axis extending centrally through said folding station, means on said support to position a tubular blank coaxially in said folding station, internal means mounted on said support within said folding station adjacent said axis for outward movement from said axis to said folding station, external means mounted on said support outside of said folding station for coaction with said internal means, means to move said internal means outwardly to said folding station to coact with said external means on the same pleat portion of the tubular blank to form a pleat in the tubular blank.

27. In a folding machine, a support having a ring-like folding station and an axis extending centrally through said folding station, means on said support to position a tubular blank coaxially in said folding station, internal means mounted on said support within said folding station adjacent said axis for outward movement from said axis to said folding station, external means mounted on said support outside of said folding station for inward movement to said folding station, means to cooperatively move said internal means outwardly and said external means inwardly to said folding station to coact on the same pleat portion of the tubular blank to form a pleat.

28. In a folding machine, a support having a tubular folding station coaxially located on the machine axis, means to guide a tubular blank coaxially of said tubular folding station, internal formers mounted on said support within said tubular folding station for axial reciprocating and outward movement to said tubular folding station to contact the inside of a tubular blank, means mounted on said support to engage and to reciprocate and move said internal formers outwardly, external formers mounted on said support externally of said tubular folding station for inward movement to said tubular folding station to contact the outside of the tubular blank and for longitudinal movement axially through said tubular folding station to move the pleat from said folding station, means on said support to move said external formers inwardly and longitudinally to cooperate with said reciprocating and outwardly moving internal formers to coactively engage the same pleat portion of the tubular blank to form a pleat.

29. In a bellows folding machine, a frame having a tubular folding station, means mounted on said frame to guide a tube coaxially in said tubular folding station, means to continuously and non-rotatively move a tube through said tubular folding station, means mounted on said frame to engage the tube to form a series of discontinuous transverse pleats spaced from the opposite wall of the tube with alternate pleats circumferentially displaced in the tube while the tube passes through said tubular folding station, and means operably connected to drive said last mentioned means to form the pleats.

30. In a bellows folding machine, a frame having a tubular folding station, means mounted on said frame to guide a tube coaxially in said tubular folding station, means to continuously move a tube through said tubular folding station, folding means mounted on said frame within said tubular folding station, folding means mounted on said frame externally of said tubular folding station, said folding means cooperating in said tubular folding station and engaging opposite sides of the same pleat portion of the tube to form a pleat, and drive means operably connected to drive said folding means in coordination with said means to continuously move the tube.

31. In a bellows folding machine, a frame having a tubular folding station, means mounted on said frame to guide a tube coaxially in said tubular folding station, means to continuously move a tube through said tubular folding station, former means located within said tubular folding station and mounted on said frame, former means located externally of said tubular folding station and mounted on said frame, drive means operably connected to move said former means to said tubular folding station to engage adjacent opposed side portions of the tube wall and to move said former means axially in said tubular folding station, and said drive means moving one of said former means axially faster than the other of said former means to coact to form a pleat.

32. In a bellows folding machine, a frame having a tubular folding station, means mounted on said frame to guide a tube coaxially in said tubular folding station, means to continuously move a tube through said tubular folding station, internal means having a tube engaging portion located within said tubular folding station and mounted on said frame for outward movement to said tubular folding station and for axial reciprocating movement with and contra to the movement of the tube, external means located externally of said tubular folding station and externally supporting the tube at the tubular folding station, and means operably connected to drive said internal means to move said internal means outwardly to contact the tube and axially with the tube to coact with said external means to engage opposed sides of the same pleat portion of the tube to form a pleat.

33. In a folding machine, a frame, a rotatable member mounted on said frame for rotary movement, said rotatable member having a portion moving through an endless path having an operating portion and a return portion, a plurality of fingers mounted on said portion of the rotatable member, said finger engaging and forming sheet material while moving through said operating portion of the path, said fingers being spaced from said operating portion of said path while in said return portion of said path, radiant heating means fixed to said machine frame and located adjacent said fingers moving through said return portion of the path to radiate heat to said fingers during movement through said return portion of the path, and said fingers engaging and heating the sheet material acted upon in said operating portion of the path.

34. A method of forming a continuous bellows in a folding machine having a folding station comprising the steps of moving the tubular blank longitudinally along its axis to the folding station, forming an elongated transverse pleat in one direction at said folding station, moving said blank longitudinally along the axis of the tubular blank to present another portion at said folding station, forming an elongated transverse pleat circumferentially spaced from the first formed pleat, moving said blank longitudinally along the axis of the tubular blank to present another portion at said folding station, forming an elongated transverse pleat circumferentially spaced from the last formed pleat, and individually compressing each of said completed pleats to set the crease when the pleated tube moves past said folding station.

35. In a folding machine for folding a blank, means to guide a blank through a folding station, a group of first formers mounted for rotary movement through a cycle in a closed path having a portion in said folding station, a second former mounted for movement through a cycle in a path having a portion in said folding station, drive means moving and guiding said second former through a complete cycle to position said second former in said folding station each time one of said group of first formers is in said folding station, said first and second formers cooperating in said folding station to engage the blank between said first and second formers to fold the blank.

36. In a folding machine as defined in claim 35, an endless belt having a curved portion in said folding station and a straight portion, said group of first formers positioned on said endless belt and located closely adjacent each other, said second former folding said blank between said first formers, and said first formers moving closer together in said straight portion to engage and compress the folds between said first formers to set the crease therein.

References Cited in the file of this patent

UNITED STATES PATENTS

| Number | Name | Date |
|---|---|---|
| 898,167 | Avery | Sept. 8, 1908 |
| 1,170,209 | Wood | Feb. 1, 1916 |
| 1,225,730 | Gargiulo | May 8, 1917 |
| 1,255,134 | Casey | Feb. 5, 1918 |
| 1,290,800 | Teall | Jan. 7, 1919 |
| 1,453,846 | La Croix | May 1, 1923 |
| 1,832,238 | Peck | Nov. 17, 1931 |
| 1,956,820 | Bergstein | May 1, 1934 |
| 2,002,896 | Kopetz | May 28, 1935 |
| 2,033,717 | Kopetz | Mar. 10, 1936 |
| 2,037,247 | Lindgren | Apr. 14, 1936 |
| 2,123,175 | Balsam | July 12, 1938 |
| 2,343,096 | Stahl | Feb. 29, 1944 |
| 2,430,463 | Gilbert | Nov. 11, 1947 |
| 2,468,254 | Deloye | Apr. 26, 1949 |

FOREIGN PATENTS

| Number | Country | Date |
|---|---|---|
| 336,941 | Italy | of 1936 |
| 361,559 | France | of 1906 |
| 444,331 | Great Britain | Mar. 19, 1936 |
| 509,434 | Great Britain | July 17, 1939 |
| 597,458 | Great Britain | Jan. 27, 1948 |